(12) United States Patent
Ma

(10) Patent No.: US 9,645,876 B2
(45) Date of Patent: May 9, 2017

(54) ELECTRONIC DEVICE WITH EMERGENCY POWER SUPPLY

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Jin-Shan Ma, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 129 days.

(21) Appl. No.: 14/753,985

(22) Filed: Jun. 29, 2015

(65) Prior Publication Data

US 2016/0328280 A1 Nov. 10, 2016

(30) Foreign Application Priority Data

May 8, 2015 (CN) .......................... 2015 1 0231476

(51) Int. Cl.
*G06F 11/00* (2006.01)
*G06F 11/07* (2006.01)
*G06F 3/06* (2006.01)

(52) U.S. Cl.
CPC .......... *G06F 11/079* (2013.01); *G06F 3/0617* (2013.01); *G06F 3/0653* (2013.01); *G06F 3/0689* (2013.01); *G06F 11/0727* (2013.01); *G06F 11/0751* (2013.01); *G06F 11/0772* (2013.01)

(58) Field of Classification Search
USPC .......................................... 714/48
See application file for complete search history.

(56) References Cited

U.S. PATENT DOCUMENTS

| 4,837,565 | A | * | 6/1989 | White | G09F 9/33 340/815.45 |
|---|---|---|---|---|---|
| 5,367,647 | A | * | 11/1994 | Coulson | G06F 1/305 710/105 |
| 5,754,112 | A | * | 5/1998 | Novak | G06F 11/325 340/332 |
| 5,790,374 | A | * | 8/1998 | Wong | G02B 6/0005 361/679.32 |
| 6,101,559 | A | * | 8/2000 | Schultz | G06F 3/0605 340/635 |

(Continued)

*Primary Examiner* — Amine Riad
(74) *Attorney, Agent, or Firm* — Steven Reiss

(57) ABSTRACT

An electronic device includes a number of hard disk devices, a detection system, and a power supply. The detection system includes a detection device, a controller, and an emergency power supply. The power supply is coupled to the hard disk devices and the detection system, to power the hard disk devices and the detection system. The emergency power supply is coupled to the controller and the display device, to power the controller and the display device. The controller is coupled to the detection device and the display device. The detection device detects data of the hard disk devices and transmits the data to the controller. The controller receives the data from the detection device, and transmits the data to the display device. The display device displays the data.

8 Claims, 2 Drawing Sheets

(56) References Cited

U.S. PATENT DOCUMENTS

| | | | | |
|---|---|---|---|---|
| 6,778,409 B2* | 8/2004 | Jones | H05K 7/1422 |
| | | | 174/50 |
| 6,888,322 B2* | 5/2005 | Dowling | G06F 1/181 |
| | | | 315/292 |
| 6,907,500 B2* | 6/2005 | Suzuki | G06F 11/006 |
| | | | 711/114 |
| 7,113,196 B2* | 9/2006 | Kerr | G06F 1/16 |
| | | | 315/292 |
| 7,395,460 B2* | 7/2008 | El-Batal | G06F 11/2221 |
| | | | 714/42 |
| 7,673,176 B2* | 3/2010 | Bradshaw | G06F 11/326 |
| | | | 714/14 |
| 7,685,463 B1* | 3/2010 | Linnell | G06F 11/2094 |
| | | | 714/5.1 |
| 7,805,630 B2* | 9/2010 | Kerner | G06F 11/0727 |
| | | | 714/42 |
| 2002/0054477 A1* | 5/2002 | Coffey | G06F 11/0727 |
| | | | 361/679.45 |
| 2002/0190868 A1* | 12/2002 | Dearborn | G06F 11/326 |
| | | | 340/691.1 |
| 2005/0278575 A1* | 12/2005 | Nicholson | G06F 11/008 |
| | | | 714/37 |
| 2006/0282709 A1* | 12/2006 | Shu | G06F 11/0727 |
| | | | 714/100 |
| 2008/0275924 A1* | 11/2008 | Fries | G06F 11/1469 |
| 2015/0074450 A1* | 3/2015 | Blount | G06F 11/0727 |
| | | | 714/6.1 |

* cited by examiner

ELECTRONIC DEVICE WITH EMERGENCY POWER SUPPLY

FIELD

The subject matter herein generally relates to electronic devices, and particularly to an electronic device with an emergency power supply.

BACKGROUND

A server can be configured to provide for data storage. The storage of data can be within the physical server itself or in separate devices. Each server includes a plurality of hard disk devices to store data. If one of the hard disk devices fails and needs to be repaired, the individual drive must be located and removed.

BRIEF DESCRIPTION OF THE DRAWINGS

Implementations of the present technology will now be described, by way of example only, with reference to the attached figures.

DETAILED DESCRIPTION

Figure 1:
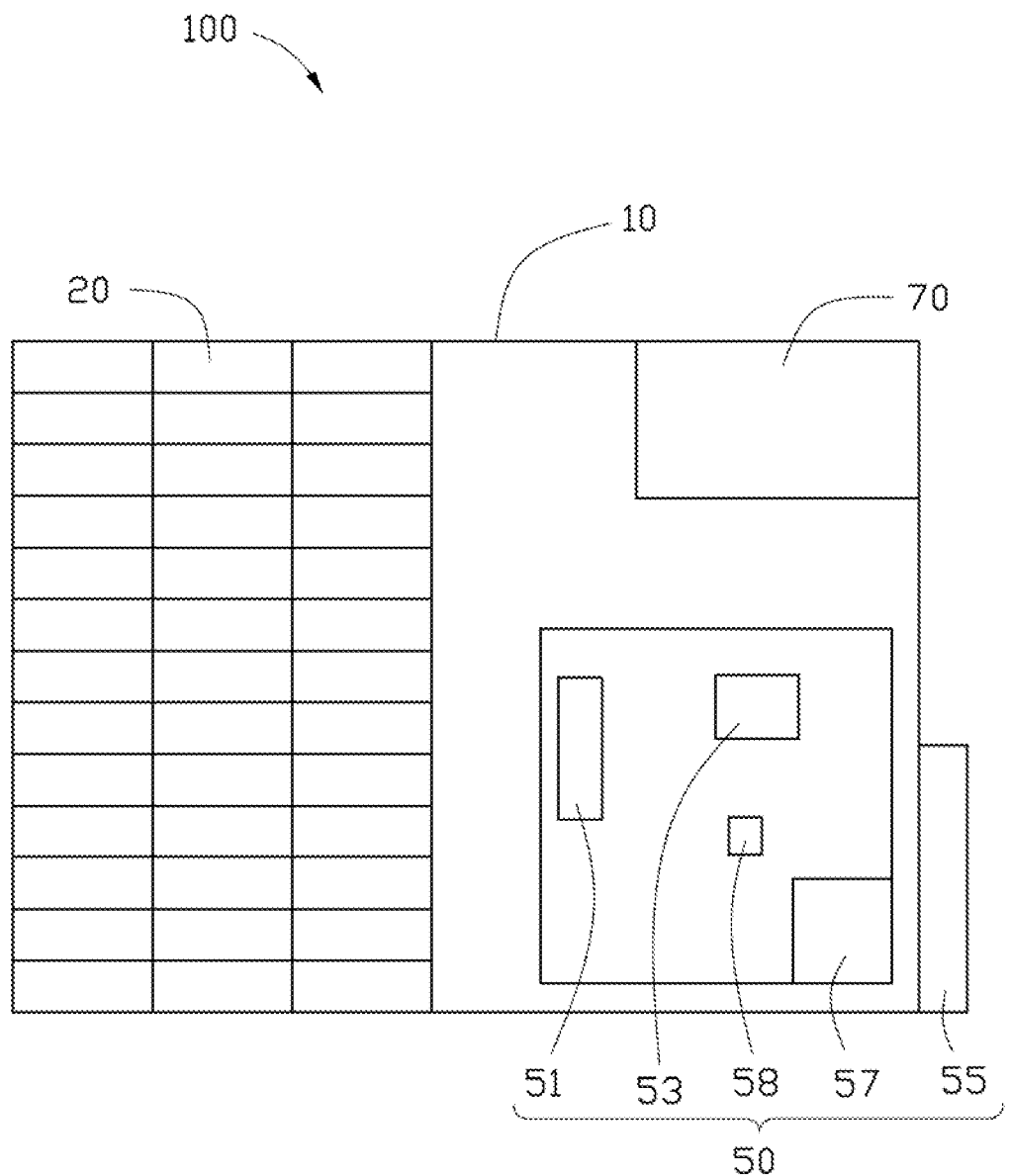
FIG. 1 is an elevational view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising" means "including, but not necessarily limited to"; it specifically indicates open-ended inclusion or membership in a so-described combination, group, series and the like.

The present disclosure is described in relation to an electronic device.

FIG. 1 illustrates an embodiment of an electronic device 100. The electronic device 100 comprises a chassis 10, a plurality of hard disk devices 20 received in the chassis 10, a detection system 50, and a power supply 70. The power supply 70 is used to power the hard disk devices 20 and the detection system 50.

Figure 2:
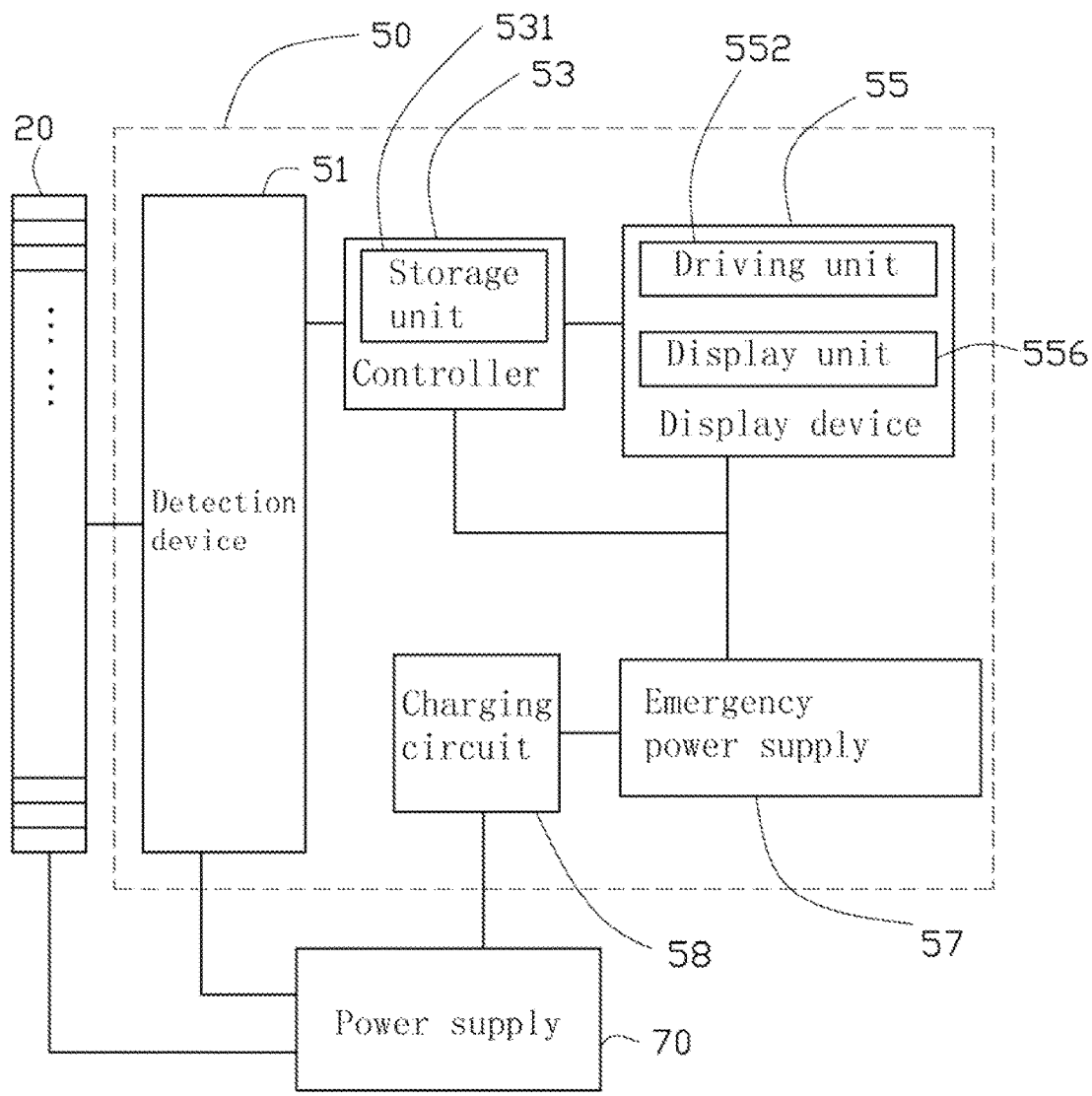
FIG. 2 is a block diagram of an embodiment of an electronic device.

FIG. 2 illustrates a block diagram of the electronic device 100. The detection system 50 comprises a detection device 51 electrically coupled to the hard disk devices 20, a controller 53, a display device 55, an emergency power supply 57, and a charging circuit 58. The power supply 70 is electrically coupled to the detection device 51, to power the detection device 51. The power supply 70 is electrically coupled to the emergency power supply 57 through the charging circuit 58 to power the emergency power supply 57. The controller 53 is electrically coupled to the detection device 51 and the display device 55. The emergency power supply 57 is electrically coupled to the controller 53 and the display device 55 to power the controller 53 and the display device 55. The controller 53 comprises a storage unit 531. The display device 55 comprises a driving unit 552 and a display unit 556. In at least one embodiment, the detection device 51 is a hard disk expansion chip, and the hard disk expansion chip can record places, models, and failure and other data of the hard disk devices 20.

In at least one embodiment, the electronic device 100 is a server, and the emergency power supply 57 is a lithium battery.

When the detection system 50 operates, the detection device 51 detects the places, models, and failure and other data of the hard disk devices 20 every two seconds, and transmit the above data to the controller 53. The controller 53 receives the date from the detection device 51, stores the date received from the detection device 51 to the storage unit 531, and transmits the data to the driving unit 552 of the display device 55. The driving unit 552 drives the display unit 556 to display the data received from the controller 53. When the power supply 70 is turned off, the hard disk devices 20 and the detection device 51 stop working, and the emergency power supply 57 maintains supplying power to the controller 53 and the display device 55. The controller 53 stores data received at last time from the detection device 51, before the detection device 51 being powered off, to the storage unit 531, and transmits the data to the driving unit 552. The driving unit 552 drives the display unit 556 to display the data. The hard disk devices 20 are repaired according to the data displayed by the display device 55.

In use, the power supply 70 supplies power to the hard disk devices 20 and the detection device 51, and the hard disk devices 20 and the detection device 51 operate. The power supply 70 further supplies power to the emergency power supply 57 through the charging circuit 58. The emergency power supply 57 supplies power to the controller 53 and the display device 55. When the display device 55 displays one or more of the hard disk devices 20 fail, the power supply 70 is turned off, and the hard disk devices 20 and the detection device 51 to be interrupted. The emergency power supply 57 maintains supplying power to the controller 53 and the display device 55. The controller 53 transmits data received from the detection device 51 at last time to the driving unit 552, and the driving unit 552 drives the display unit 556 displaying the data. The one or more hard disk devices 20 are repaired according to the data displayed by the display device 55. Therefore, it is convenient to repair the hard disk devices 20.

In other embodiments, the detection device 51 detects the places, models, and failures and other data of the hard disk devices 20, and transmits the data to the controller 53 every three seconds, one seconds, or any seconds.

Even though numerous characteristics and advantages of the embodiments have been set forth in the foregoing description, together with details of the structure and function of the embodiments, the present disclosure is illustrative only, and changes may be made in detail, including in the matters of shape, size, and arrangement of parts within the principles of the embodiments to the full extent indicated by the broad general meaning of the terms in which the appended claims are expressed.

What is claimed is:

1. An electronic device, comprising:
 a plurality of hard disk devices;
 a detection system coupled to the plurality of hard disk drives and comprising:
  a detection device electrically coupled to the hard disk devices and configured to detect data of the hard disk devices, wherein the data comprises places, models, and failure of the hard disk devices;
  a controller electrically coupled to the detection device and configured to receive the data;
  a display device electrically coupled to the controller and configured to receive the data and display the data; and
  an emergency power supply electrically coupled to the controller and the display device to power the controller and the display device; and
 a power supply electrically coupled to the hard disk devices, the detection device, and the emergency power supply and configured to power the hard disk devices, the detection device, and the emergency power supply.

2. The electronic device of claim 1, wherein the detection device detects the data of the hard disk devices every two seconds, and transmits the data to the controller.

3. The electronic device of claim 1, wherein the emergency power supply maintains powering the controller and the display device, the controller transmits data received from the detection device at last time to the display device, and the display device displays the data, in event that the power supply is turned off.

4. The electronic device of claim 1, wherein the detection system further comprises a charging circuit configured to charge the emergency power supply; the power supply is electrically coupled to the emergency power supply through the charging circuit, and powers the emergency power supply through the charging circuit.

5. The electronic device of claim 1, wherein the emergency power supply is a lithium battery.

6. The electronic device of claim 1, wherein the controller comprises a storage unit to store the data received from the detection device.

7. The electronic device of claim 1, wherein the display device comprises a driving unit and a display unit, the driving unit is electrically coupled to the controller and the display unit, the driving unit is configured to receive the data from the controller and drive the display unit to display the data.

8. The electronic device of claim 1, wherein detection device is a hard disk expansion chip.

* * * * *